US006959238B2

(12) United States Patent
Morishita et al.

(10) Patent No.: US 6,959,238 B2
(45) Date of Patent: Oct. 25, 2005

(54) VEHICLE CONTROL APPARATUS

(75) Inventors: Naohisa Morishita, Saitama (JP); Tetsurou Hamada, Saitama (JP); Takashi Aoki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/383,511

(22) Filed: Mar. 10, 2003

(65) Prior Publication Data

US 2003/0171868 A1 Sep. 11, 2003

(30) Foreign Application Priority Data

Mar. 11, 2002 (JP) .......................... P2002-066057

(51) Int. Cl.[7] ................................................ G06F 7/00

(52) U.S. Cl. .......................... 701/54; 701/51; 701/67; 477/115

(58) Field of Search ............................ 701/51, 53, 54, 701/55, 67–68, 101–102, 112; 477/3–11, 477/14, 20–21, 24, 92–95, 99, 107, 115, 181, 477/173–175, 183, 199, 203, 70; 123/179.4, 123/406.53, 406.54, 338, 364, 370, 383, 123/179.1, 179.3; 192/3.61, 3.63, 219; 180/65.6, 180/65.7; 307/10.1, 10.6

(56) References Cited

U.S. PATENT DOCUMENTS

| | | | | |
|---|---|---|---|---|
| 6,251,046 | B1 * | 6/2001 | Yoshino et al. | 477/187 |
| 6,463,375 | B2 * | 10/2002 | Matsubara et al. | 701/54 |
| 6,482,127 | B2 * | 11/2002 | Katou | 477/192 |
| 6,695,744 | B2 * | 2/2004 | Shimabukuro et al. | 477/102 |
| 2002/0103055 | A1 * | 8/2002 | Tani et al. | 477/115 |

FOREIGN PATENT DOCUMENTS

| | | |
|---|---|---|
| JP | 60-125738 | 7/1985 |

* cited by examiner

*Primary Examiner*—Jacques H. Louis-Jacques
(74) *Attorney, Agent, or Firm*—Westerman, Hattori, Daniels & Adrian, LLP

(57) ABSTRACT

A vehicle control apparatus generates an appropriate driving force according to the will of a driver when an internal combustion engine is restarted from a condition in which the idling of the engine is being stopped. In a condition in which the idling of an internal combustion engine 11 is being stopped, in the event that the depressing amount of a brake pedal by the driver is relatively large, an ECU (20) selects a relatively low-speed side gear of a transmission (15) so as to connect an input shaft (15A) and an output shaft (15B) together, and in contrast, in the event that the depressing amount of the brake pedal by the driver is relatively small, the ECU (20) selects a relatively high-speed side gear of the transmission (15) so as to connect the input shaft (15A) and the output shaft (15B) together.

5 Claims, 2 Drawing Sheets

CLUTCH PRESSURE (2ND GEAR)
Pon
Poff
0
t1
t2

CREEPING TORQUE
Tr1
Tr2
0
t1

BRAKE PRESSURE
PB2
PB0
0
t1

CLUTCH PRESSURE (5TH GEAR)
Pon
Poff
0
t1

CREEPING TORQUE
Tr1
Tr5
0
t1

BRAKE PRESSURE
PB5
PB0
0
t1

VEHICLE CONTROL APPARATUS

BACKGROUND OF THE INVENTION

1. Field of the Invention

The present invention relates to a vehicle control apparatus having an automatic transmission and adapted to stop the idling of an engine under a predetermined stop condition, and more particularly to a technology for controlling the operation of the automatic transmission when the idling of the engine is stopped.

2. Description of the Related Art

There have been known conventional automatic engine stop and start apparatuses, as with, for example, an automatic engine stop and start apparatus disclosed by JP-A-60-125738, which include an engine stop/start means for automatically stopping or starting an engine when a predetermined engine stop or start condition is met, a high-speed gear selecting means for selecting a high-speed gear of an automatic transmission when the engine is stopped, and a low-speed gear selecting means for selecting a low-speed gear of the automatic transmission after a predetermined length of time has passed since the engine is started.

In this automatic engine stop and start apparatus, the generation of excessive so-called creeping torque that would be accompanied by the start of the engine is restrained by the arrangement in which a high-speed gear is selected when the engine is started.

Incidentally, with the above prior art automatic engine stop and start apparatus in which a high-speed gear of the automatic transmission is set to be selected when the engine is started, for example, even in case the driver wants a quick start, there may be a risk of causing a delay in building up a driving force. Namely, when the driver starts the vehicle after he or she has released the brake there may be a case where a desired driving force cannot be generated at an appropriate timing due to a time lag required when the gears of the automatic transmission are changed from the high-speed gear to the low-speed gear.

SUMMARY OF THE INVENTION

The invention was made in view of the situation, and an object thereof is to provide a vehicle control apparatus which can generate an appropriate driving force from an internal combustion engine according to the will of the driver when he or she attempts to restart the internal combustion engine from an idling-stopped condition.

With a view to attaining the object, according to a first aspect of the invention, there is provided a vehicle control apparatus including:

a transmission (for example, a transmission 15 in an embodiment that will be described later) having a connecting and disconnecting unit (for example, a first gear clutch 21 and respective synchro-clutches 22, . . . , 26 in the embodiment that will be described later) for changing meshing conditions between a plurality of change-speed gears (for example, forward first to fifth gear wheel pairs 31, . . . , 35 and a reverse gear train 36 in the embodiment that will be described later) provided on an input shaft (for example, an input shaft 15A in the embodiment that will be described later) connected to an internal combustion engine (for example, an internal combustion engine 11 in the embodiment that will be described later) and an output shaft (for example, an output shaft 15B in the embodiment that will be described later) connected to driving wheels for connecting the input shaft with the output shaft in such a manner as to change gear ratios in stepped fashion to thereby transmit the driving force of the internal combustion engine to the driving wheel;

an operating condition detecting unit (for example, a brake pedal switch 45, a brake pressure detector 46 in the embodiment that will be described later) for detecting an operating condition of a braking unit (for example, a brake pedal in the embodiment that will be described later) operated by a driver;

a stop condition detecting unit (for example, a vehicle speed sensor 43, an engine speed sensor 44 in the embodiment that will be described later) for detecting a stop condition of the internal combustion engine, and;

a shift control unit (for example, an ECU 20 in the embodiment that will be described later) for controlling the operation of the connecting and disconnecting unit according to the operating condition detected by the operating condition detecting unit when the stop condition is detected by the stop condition detecting unit.

According to the vehicle control apparatus constructed as described above, the operating condition detecting unit has detected the operating condition of the braking unit operated by the driver when the internal combustion engine is stopped, and the connecting and disconnecting unit changes gear ratios of the transmission in stepped fashion according to the detected operating condition, whereby an appropriate driving torque can be generated according to the braking operation by the driver when the internal combustion engine is started to thereby prevent the generation of excessive so-called creeping torque that would be accompanied by the start of the internal combustion engine. Moreover, the high-speed gear is prevented from being selected excessively when the vehicle is started to thereby restrain the time lag required for selecting and changing gears, thereby making it possible to generate quickly a desired driving torque.

Furthermore, according to a second aspect of the invention, there is provided a vehicle control apparatus as set forth in the first aspect of the invention, wherein the shift control unit connects the input shaft with the output shaft by selecting a relatively low-speed side change-speed gear from the plurality of change-speed gears in the event that the operating amount (for example, the depressing amount, brake pressure and depressing load of the brake pedal in the embodiment that will be described later) of the braking unit detected by the operating condition detecting unit is relatively large or by selecting a relatively high-speed side change-speed gear from the plurality of change-speed gears in the event that the operating amount of the braking unit detected by the operating condition detecting unit is relatively small.

According to the vehicle control apparatus constructed as described above, in the event that the operating amount of the braking unit is relatively large, the relatively low-speed side change-speed gear is selected, whereby the response can be improved when the vehicle is started. In addition, in the event that the operating amount of the braking unit is relatively small, the relatively high-speed side change-speed gear is selected, whereby the generation of excessive so-called creeping torque can be prevented which would be accompanied by the start of the internal combustion engine.

Thus, an appropriate gear can be selected according to the braking operation by the driver, and the high-speed gear is prevented from being selected excessively when the vehicle is started to thereby restrain a time lag required for selecting and changing the gears, whereby a desired driving torque can quickly be generated.

Furthermore, according to a third aspect of the invention, there is provided a vehicle control apparatus as set forth in the second aspect of the invention, wherein at least the low-speed side change-speed gear is connected to the output shaft by way of a one-way clutch (for example, a one-way clutch 27 in the embodiment that will be described later).

According to the vehicle control apparatus constructed as described above, since the low-speed side change-speed gear is connected to the output shaft by way of the one-way clutch, the gear wheels on the low-speed side are kept meshing with each other at all times, and in the event that for example the high-speed side gear is selected, only the transmission of the driving force by way of the low-speed side change-speed gear is simply cut off by the one-way clutch. Due to this, even in the event that for example, the relatively high-speed side change-speed gear is selected while the internal combustion engine is being stopped, a desired driving torque can be generated by the low-speed side change-speed gear immediately after the selection of the high-speed side change-speed gear is released in conjunction with the release of the braking operation by the driver, whereby the generation of a time lag accompanied by changing the gears can be restrained better, for example, by selectively changing the change-speed gears for meshing when compared with a case where the transmission path of a driving force is switched from the high-speed side change-speed gear to the low-speed side change-speed gear.

Furthermore, according to a fourth aspect of the invention, there is provided a vehicle control apparatus as set forth in any of the first to third aspects of the invention, further including an electric oil pump (for example, an electric oil pump 17 in the embodiment that will be described later) for generating an oil pressure for driving the connecting and disconnecting unit, wherein the shift control unit activates the connecting and disconnecting unit using an oil pressure supplied from the electric oil pump when the stop condition detecting unit detects a stop condition of the internal combustion engine.

According to the vehicle control apparatus constructed as described above, the shift control apparatus can ensure the operation of the connecting and disconnecting unit by activating the electric oil pump even in the event that the discharge pressure of a mechanical oil pump driven by the internal combustion engine is lowered, for example, when the internal combustion engine comes to a stop.

Furthermore, according to a fifth aspect of the invention, there is provided a vehicle control apparatus as set forth in any of the second to fourth aspects of the invention, wherein the low-speed side change-speed gear is a low gear (for example, a forward first gear wheel pair 31 in the embodiment that will be described later) or a second gear (for example, a forward second gear wheel pair 32 in the embodiment that will be described later).

According to the vehicle control apparatus constructed as described above, in the event that the operating amount of the braking unit is relatively large, the low gear or the second gear is selected so that the high-speed gear is prevented from being selected excessively to thereby restrain the time lag required for selecting and changing the gears, whereby a desired driving torque can be generated quickly, thereby making it possible to improve the response when the vehicle is started from rest.

DETAILED DESCRIPTION OF THE PREFERRED EMBODIMENTS

Referring to the accompanying drawings, a vehicle control apparatus according to an embodiment of the invention will be described below.

Figure 1:
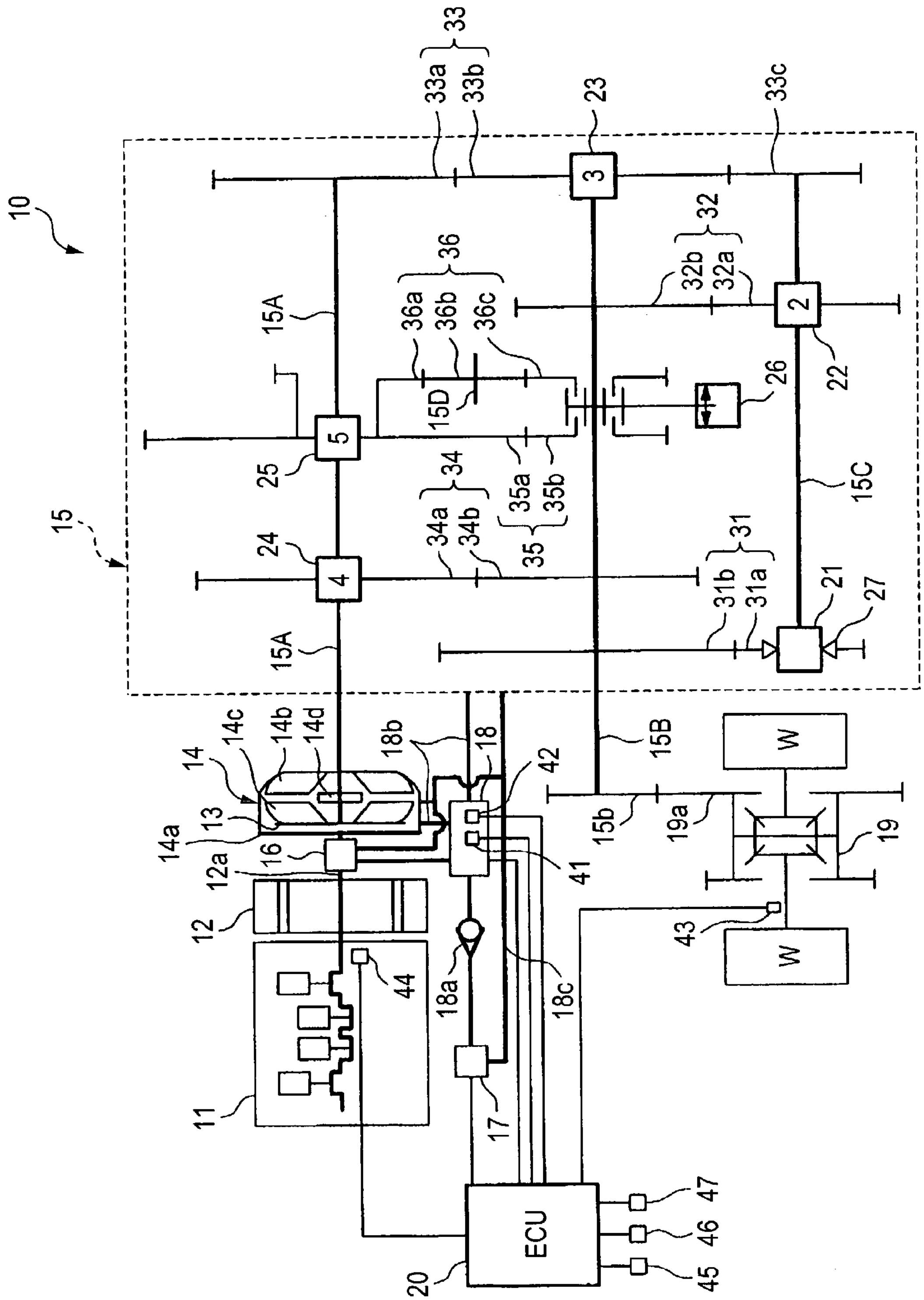
FIG. 1 is a diagram showing a main part of a hybrid vehicle comprising a vehicle control apparatus according to an embodiment of the invention.

FIG. 1 is a diagram showing the construction of a main part of a hybrid vehicle having a vehicle control apparatus 10 according an embodiment of the invention.

The vehicle control apparatus 10 according to the embodiment is such as to transmit the driving force of at least either of an internal combustion engine 11 and a motor 12 to driving wheels W, W of a vehicle via a torque converter 14 and a transmission 15. The vehicle control apparatus 10 includes the internal combustion engine 11 and the motor 12 which are directly connected to each other in series, the torque converter 14 connected to a rotational shaft 12*a* of the motor 12, the transmission 15, a mechanical oil pump 16 and an electric oil pump 17 which generate oil pressures for controlling the driving of the torque converter 14 and the transmission 15, an oil pressure supply unit 18, a differential 19 for distributing the driving force between the left and right driving wheels W, W and an ECU 20.

The torque converter 14 is such as to transmit a torque via a fluid and includes a pump impeller 14*b* which is made integral with a front cover 14*a* connected to the rotational shaft 12*a* of the motor 12, a turbine runner 14*c* disposed between the front cover 14*a* and the pump impeller 14*b* in such a manner as to confront the pump impeller 14*b* and a stator 14*d* disposed between the pump impeller 14*b* and the turbine runner 14*c*.

Furthermore, provided between the turbine runner 14*c* and the front cover 14*a* is a lock-up clutch 13 which is pressed toward an inner surface of the front cover 14*a* so as to come into engagement with the front cover 14*a*.

Then, a hydraulic fluid (an automatic transmission fluid or ATF) is sealed in a container constituted by the front cover 14*a* and the pump impeller 14*b*.

Here, when the pump impeller 14*b* rotates together with the front cover 14*a* while the lock-up clutch 13 is released from an engaged condition a vortex flow of hydraulic fluid is generated, and the vortex flow of hydraulic fluid so generated is then applied to the turbine runner 14*c* to thereby generate a rotational driving force, whereby a torque is transmitted via the hydraulic fluid.

In addition, when the lock-up clutch 13 is set to the engaged condition the rotational driving force is directly transmitted from the front cover 14*a* to the turbine runner 14*c* without the involvement of the hydraulic fluid.

Note that the engaged condition of the lock-up clutch 13 is made variable, whereby the rotational driving force transmitted from the front cover 14*a* to the turbine runner 14*c* via the lock-up clutch 13 can be changed arbitrarily.

The transmission 15 is of an automatic transmission type in which the shift operation is controlled, for example, through the drive of respective synchro-clutches 22, . . . , 26 by the ECU 20.

Here, a coupling gear 15*b* provided integrally with an output shaft 15B of the transmission 15 is set to mesh at all times with a gear 19*a* of the differential 19 for distributing the driving force between the left and right driving wheels W, W.

The transmission 15 includes, for example, an input shaft 15A which is a main shaft, the output shaft 15B which is a counter shaft, a drive shaft 15C, a reverse gear wheel shaft 15D, a first gear clutch 21, the respective synchro-clutches 22, . . . , 26, a one-way clutch 27, forward first to fifth gear wheel pairs 31, . . . , 35 which are set to have different gear ratios, respectively, and a reverse gear wheel train 36. In addition, these input shaft 15A, output shaft 15B, drive shaft 15C and reverse gear wheel shaft 15D are disposed in parallel with one another.

The forward first and second gear wheel pairs 31, 32 are constituted by drive side forward first and second gear wheels 31*a*, 32*a* attached to the drive shaft 15C and output side forward first and second gear wheels 31*b*, 32*b* attached to the output shaft 15B, respectively. The gear wheels 31*a* and 31*b* which constitute a pair and the gear wheels 32*a* and 32*b* which constitute a pair mesh with each other at all times, respectively.

Here, the output side forward first gear wheel 31*b* and output side forward second gear wheel 32*b* are provided integrally on the output shaft 15B. The output side forward second gear wheel 32*a* which constitutes the pair together with the drive side forward second gear wheel 32*b* is made to be an idle gear wheel which can rotate relative to the drive shaft 15C and is connected to or disconnected from the drive shaft 15C by means of the second gear synchro-clutch 22.

In addition, the drive side forward first gearwheel 31*a* which constitutes the pair together with the output side forward first gear wheel 31*b* is connected to the drive shaft 15C via the first gear clutch 21 and the one-way clutch 27.

The first gear clutch 21 is set in a connected condition at all times whenever the shift operation of the transmission 15 is controlled except when a neutral condition or a reverse is selected where the oil supply from the oil supply unit 18, which will be described later, is stopped.

The one-way clutch 27 transmits the driving force to the output shaft 15B via the drive shaft 15C when the input shaft 15A rotates in a state in which the connection of the respective synchro-clutches 22, . . . , 26 is released. Additionally, while the drive side forward gear wheel 31*a* connected to the drive shaft 15C by way of the first gear clutch 21 rotates together with the drive shaft 15C when the input shaft 15A rotates even in case the respective synchro-clutches 22, . . . , 26 are brought to a connected condition, the driving force is set such that the force is not transmitted from the drive shaft 15C to the output shaft 15B by the action of the one-way clutch 27.

The forward third to fifth gear wheel pairs 33 to 35 are constituted by respective input side forward third to fifth gear wheels 33*a* to 35*a* which are attached to the input shaft 15A and respective output side forward third to fifth gear wheels 33*b* to 35*b* which are attached to the output shaft 15B, and the respective pairs of gear wheels 33*a* and 33*b*, 34*a* and 34*b*, and 35*a* and 35*b* mesh with each other at all times.

Furthermore, a drive side gear wheel 33*c* is provided on the drive shaft 15C which constitutes a pair together with the output side forward third gear wheel 33*b* and meshes with the same third gear wheel 33*b* at all times.

In addition, the reverse gear wheel train 36 is constituted by an input side reverse gear wheel 36*a* attached to the input shaft 15A, a reverse gear wheel 36*b* attached to the reverse gear wheel shaft 15D and an output side reverse gear wheel 36*c* attached to the output shaft 15B, and the pairs of gear wheels 36*ba* and 36*b*, and 36*b* and 36*c* mesh with each other at all times, respectively.

Here, the output side forward third gear wheel 33*b* which meshes with the input side forward third gear wheel 33*a* provided integrally on the input shaft 15A and the drive side forward third gear wheel 33*c* provided integrally on the drive shaft 15C is made to be an idle gear wheel which can rotate relative to the output shaft 15B and is connected with or disconnected from the output shaft 15B by means of the third gear synchro-clutch 23.

Additionally, the input side forward fourth gear wheel 34*a* which constitutes the pair together with the output side forward fourth gear wheel 34*b* provided integrally on the output shaft 15B is made to be an idle gear wheel which can rotate relative to the input shaft 15A and is connected with or disconnected from the input shaft 15A by means of the fourth gear synchro-clutch 24.

In addition, the input side forward fifth gear wheel 35*a* and the input side reverse gear wheel 36*a* are made to be idle gear wheels which can rotate relative to the input shaft 15A, the output side forward fifth gear wheel 35*b* and the output side reverse gear wheel 36*b* are made to be idle gear wheels which can rotate relative to the output shaft 15B, and the reverse gear wheel 36*b* is provided integrally with the reverse gear wheel shaft 15D.

Here, the input side forward fifth gear wheel 35*a* and the input side reverse gear wheel 36*a* are connected with or disconnected from the input shaft 15A by means of the fifth gear synchro-clutch 25.

Furthermore, either the output side forward fifth gear wheel 35*b* or the output side reverse gear wheel 36*b* is selected by the synchro-clutch 26 for connection with or disconnection from the output shaft 15B.

Namely, the input shaft 15A and the drive shaft 15C are made to mesh with each other at all times by way of the forward third gear wheel pair 33 and the drive side gear wheel 33*c*, and when any of the second to fourth gears is selected the input and drive shafts 15A, 15C and the output shaft 15B are connected together by means of any of the respective synchro-clutches 22 to 24, whereby the first gear clutch 21 is brought to the connected condition and the one-way clutch 27 for the forward first gear wheel pair 31 freewheels.

In addition, when the fifth gear is selected the input side forward fifth gear wheel 35*a* and the input side reverse gear wheel 36*a* are connected with the input shaft 15A by means of the fifth gear synchro-clutch 25, and the output side forward fifth gear wheel 35*b* is connected with the output shaft 15B by means of the synchro-clutch 26, whereby the first gear clutch 21 is brought to the connected condition and the one-way clutch 27 for the first gear wheel pair 31 freewheels.

On the other hand, when the reverse gear is selected the input side forward fifth gear wheel 35*a* and the input side reverse gear wheel 36*a* are connected with the input shaft 15A by means of the fifth gear synchro-clutch 25, and the output side reverse gear wheel 36*c* is connected with the output shaft 15B by means of the synchro-clutch 26, whereby the first gear clutch 21 is set to a condition in which the connection is released.

Then, when none of the second to fifth and reverse gears is selected the first gear clutch 21 is kept in the connected condition and the one-way clutch 27 for the first gear wheel pair 31 does not freewheel, whereby the input shaft 15A, the drive shaft 15C and the output shaft 15B are connected together by way of the one-way clutch 27.

The oil pump 16 is disposed, for example, between the internal combustion engine 11 and the motor 12 which are directly coupled together in series and the torque converter 14, and is allowed to operate in synchronism with the input revolution speed of the torque converter 14. Namely, the oil pump 16 is driven by virtue of the output from the internal combustion engine 11 while the motor 12 is in regenerative operation or is stopped. Then, an oil path from the oil pump 16 is connected to the oil pressure supply unit 18.

In addition, the electric oil pump 17 is driven by power supplied from a battery device (not shown), and an oil path from the electric oil pump 17 is connected to the oil pressure supply unit 18 via a check valve 18*a*.

The oil pressure supply unit 18 is constructed to have, for example, a pressure and flow rate control valve and supplies oil pressures for controlling the driving of the torque converter 14 and the transmission 15 when controlled by the ECU 20.

Furthermore, the oil pressure supply unit 18 includes an oil pressure detector 41 for detecting the oil pressure (line pressure) of an oil path 18*b* for supplying a hydraulic fluid to the torque converter 14 and the transmission 15 and an oil temperature detector 42 for detecting the temperature of a hydraulic fluid (oil temperature) in the oil path 18*b*. Signals of detected values which are outputted from the respective detectors 41, 42 are inputted into the ECU 20.

Note that hydraulic fluids discharged from the torque converter 14 and the transmission 15 are supplied to the oil pump 16 and the electric oil pump 17 by way of a discharge oil path 18*c*.

The ECU 20 controls, for example, the operation of the lock-up clutch 13 and the shift operation of the transmission 15 by driving the first gear clutch 21 and the respective synchro-clutches 22, . . . , 26 according to, for example, shift operations inputted from the driver or driving conditions of the vehicle.

In addition, as will be described later, the ECU 20 controls the shift operation of the transmission 15 according to conditions in which a brake pedal (not shown) is depressed by the driver in a state in which the idling of the internal combustion engine 11 is stopped.

Due to this, inputted into the ECU 20 are signals outputted, respectively, from a vehicle speed sensor 43 for detecting the speed of the vehicle (vehicle speed) based on the revolution speed of the driving wheel W, an engine speed sensor 44 for detecting the revolution speed (engine speed) NE of the internal combustion engine 11, a brake pedal switch 45 for detecting the operation of the brake pedal by the driver, a brake pressure detector 46 provided on a brake booster (not shown) linked to the brake pedal for detecting the brake pressure and an accelerator pedal opening sensor 47 for detecting the operating amount of an accelerator pedal (not shown).

The vehicle control apparatus 10 according to the embodiment is constructed as has been described heretofore, and described next with reference to the accompanying drawings will be the operation of the vehicle control apparatus 10 so constructed, in particular, the process of controlling the shift operation of the transmission 15 by the same apparatus while the internal combustion engine 11 is being stopped.

FIGS. 2A to 2C and 2D to 2F are graphs showing example of change with time in clutch pressure, creeping torque and brake pressure when the condition of the vehicle is shifted from a condition in which the idling of the internal combustion engine 11 is stopped to a condition in which the vehicle is started from rest.

For example, when the driver depresses the brake pedal to bring the vehicle to a stop, the ECU 20 outputs an idling stop command to the internal combustion engine 11 on condition that the residual capacity of the battery is equal to or more than a predetermined residual capacity which is good enough to secure a power supply required at least to restart the internal combustion engine 11.

Since the driving of the oil pump 16 is stopped as the idling of the internal combustion engine 11 is stopped, the ECU 20 activates the electric oil pump 17 in order to enable the shift operation of the transmission 15 while the idling of the internal combustion engine 11 is being stopped.

Then, while the idling of the internal combustion engine 11 is being stopped, for example, in the event that the depressing amount of the brake pedal operated by the driver is relatively large, the ECU 20 selects the relatively low-speed side gear of the transmission 15 to connect the input shaft 15A and the output shaft 15B together in order to improve the response when the vehicle is started from rest. In contrast, in the event that the depressing amount of the brake pedal operated by the driver is relatively small, the ECU 20 selects the relatively high-speed side gear of the transmission 15 to connect the input shaft 15A and the output shaft 15B together in order to make relatively small the creeping torque generated in conjunction with the start of the internal combustion engine 11.

Figure 2:
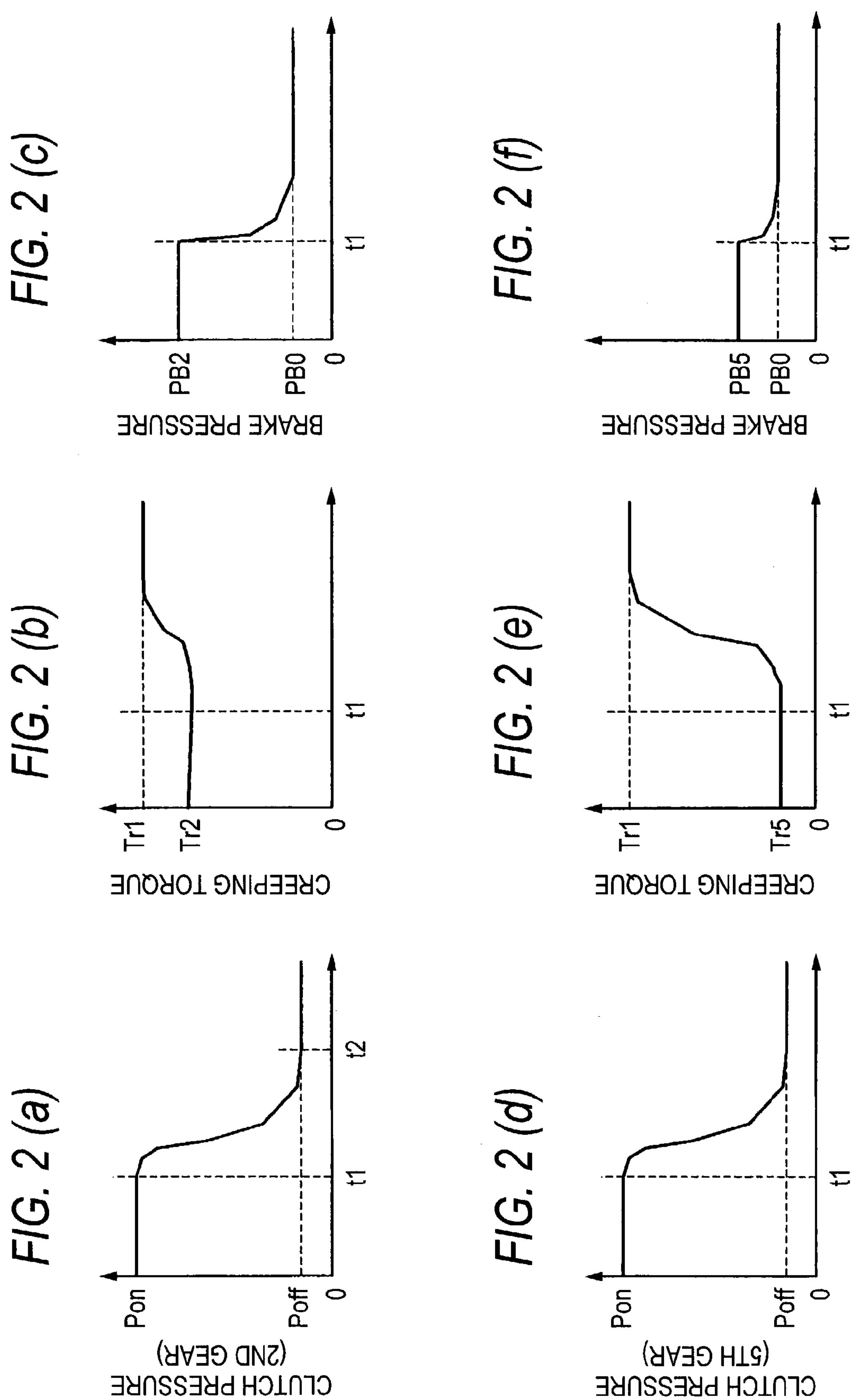
FIGS. 2A to 2C and 2D to 2F are graphs showing examples of change with time in clutch pressure, creeping torque and brake pressure when the condition of a vehicle is shifted from a condition in which the idling of an internal combustion engine is stopped to a condition in which the vehicle is started from rest.

For example, in the condition in which the idling of the internal combustion engine is stopped (for example, before time t1 shown in FIGS. 2A to 2C), as shown in FIG. 2C, in case a brake pressure outputted from the brake pressure detector 46 is a relatively large brake pressure PB2, as shown in FIG. 2B, the second gear synchro-clutch 22 is set to a connected condition so that a relatively large creeping torque Tr2 is generated as the internal combustion 11 is started. As this occurs, the first gear clutch 21 is put in a connected condition and the one-way clutch 27 for the forward first gear wheel pair 31 freewheels, whereby the driving force is designed not to be transmitted from the drive shaft 15C to the output shaft 15B via the forward first gear wheel pair 31.

Note that the creeping torque Tr2 generated in conjunction with the start of the internal combustion engine 11 only generates a smaller driving force than a braking force applied by the driver with the brake pressure PB2.

Then, as shown after time t1 in FIG. 2C, when the depressed brake pedal is operated to be released by the driver or a reduction in brake pressure is detected, the ECU 20 determines that the driver wants to start the vehicle and releases the second gear synchro-clutch 22 from the connected condition to thereby reduce the clutch pressure of the second gear synchro-clutch 22 (or the oil pressure supplied to the second gear synchro-clutch 22).

As this occurs, the freewheeling one-way clutch 27 is gradually shifted to a connected condition and the creeping torque changes to increase. Then, the driving force is designed to be transmitted only via the forward first gear wheel pair 31 at a point in time when the clutch pressure of the second gear synchro-clutch 22 decreases to an appropriate clutch pressure Poff which shows that the second gear synchro-clutch 22 is in a disconnected condition, and a creeping torque Tr1 relative to the forward first gear wheel pair 31 is generated.

Thus, even in case the depressing amount of the brake pedal by the driver is relatively large as when the vehicle is stopped in the middle of an up-slope, the relatively large creeping torque Tr2 is generated at a point in time when the depressed brake pedal is released, whereby the vehicle can be started quickly, for example, while restraining the vehicle from reversing. Moreover, since the provision of the one-way clutch 27 allows the transmission of driving force via the forward first gear wheel pair 31 immediately after the connection of the second gear synchro-clutch 22 is released, the driving force can be increased quickly.

On the other hand, in the condition in which the idling of the internal combustion engine 11 is stopped (for example, before time t1 shown in FIGS. 2D to 2F), as shown in FIG. 2F, in case a brake pressure outputted from the brake pressure detector 46 is a relatively small brake pressure PBS, as shown in FIG. 2E, the fifth gear synchro-clutch 25 is set to a connected condition so that a relatively small creeping torque Tr5 is generated as the internal combustion engine 11 is started. As this occurs, the first gear clutch 21 is put in the connected condition and the one-way clutch 27 for the forward first gear wheel pair 31 freewheels, whereby the driving force is designed not to be transmitted from the drive shaft 15C to the output shaft 15B via the forward first gear wheel pair 31.

Note that the creeping torque Tr5 generated in conjunction with the start of the internal combustion engine 11 only generates a smaller driving force than a braking force applied by the driver with the brake pressure PB5.

Then, as shown after time t1 in FIG. 2F, when the depressed brake pedal is operated to be released by the driver or a reduction in brake pressure is detected, the ECU 20 determines that the driver wants to start the vehicle and releases the fifth gear synchro-clutch 25 from the connected condition to thereby reduce the clutch pressure of the fifth gear synchro-clutch 25 (or the oil pressure supplied to the fifth gear synchro-clutch 25).

As this occurs, the freewheeling one-way clutch 27 is gradually shifted to a connected condition and the creeping torque changes to increase. Then, the driving force is designed to be transmitted only via the forward first gear wheel pair 31 at a point in time when the clutch pressure of the fifth gear synchro-clutch 25 decreases to an appropriate clutch pressure Poff which shows that the fifth gear synchro-clutch 25 is in a disconnected condition, and a creeping torque Tr1 relative to the forward first gear wheel pair 31 is generated.

Note that since the oil pump 16 is driven after the internal combustion engine 11 has been started, the ECU 20 stops the electric oil pump 17 at an appropriate timing according to, for example, the line pressure or oil temperature.

As has been described above, according to the vehicle control apparatus 10 of the embodiment, in case the operating amount of the brake pedal operated by the driver is relatively large, the relatively low-speed side gear is selected so as to prevent the high-speed side gear from being selected excessively when the vehicle is started, whereby the time lag required for selecting and changing the gears is restrained, thereby making it possible to generate a desired driving force quickly. In contrast, in case the operating amount of the brake pedal operated by the driver is relatively small, the relatively high-speed side gear is selected so as to relatively reduce the creeping torque, whereby an appropriate gear according to the braking operation by the driver can be selected.

Moreover, since the driving force is transmitted via the forward first gear wheel pair 31 immediately after the connection of any of the respective synchro-clutches 22, . . . , 26 is released by providing as a low-speed side gear the one-way clutch 27 for the first gear wheel pair 31, the driving force can be increased quickly when the vehicle is started from rest.

In addition, the oil pressures for controlling the driving of the torque converter 14 and the transmission 15 can be secured in an ensured manner when the internal combustion engine 11 is started by activating the electric oil pump 17 while the idling of the internal combustion engine 11 is being stopped.

Note that in the embodiment, while the vehicle which is equipped with the vehicle control apparatus 10 is described as being a hybrid vehicle, the invention is not limited thereto but may be applied to a vehicle adapted to run simply by virtue of the driving force of the internal combustion engine 11. In short, the invention may be applied to any vehicle in which the idling of the internal combustion engine 11 is stopped under a predetermined stop condition.

Note that in the embodiment, while the one-way clutch 27 is provided for the forward first gear wheel pair 31, the invention is not limited thereto, and the one-way clutch may be provided on another low-speed side gear, for example, the forward second gear wheel pair 32.

Note that in the embodiment, while the shift operation of the transmission 15 is controlled according the depressing amount of the brake pedal by the driver or the brake pressure in the condition in which the idling of the internal combustion engine 11 is stopped, the invention is not limited thereto, and the shift operation of the transmission 15 may be controlled according to, for example, depressing loads applied to the brake pedal.

Note that in the embodiment, while the forward second gear wheel pair 32 is selected when the brake pressure is a relatively large brake pressure, the invention is not limited thereto, the forward first gear wheel pair 31 may be selected.

As has been described heretofore, according to a first aspect of the invention, there is provided a vehicle control apparatus including: a transmission (for example, a transmission 15 in an embodiment that will be described later) having a connecting and disconnecting unit (for example, a first gear clutch 21 and respective synchro-clutches 22, . . . , 26 in the embodiment that will be described later) for changing meshing conditions between a plurality of change-speed gears (for example, forward first to fifth gear wheel pairs 31, . . . , 35 and a reverse gear train 36 in the embodiment that will be described later) provided on an input shaft (for example, an input shaft 15A in the embodiment that will be described later) connected to an internal combustion engine (for example, an internal combustion engine 11 in the embodiment that will be described later) and an output shaft (for example, an output shaft 15B in the embodiment that will be described later) connected to driving wheels for connecting the input shaft with the output shaft in such a manner as to change gear ratios in stepped fashion to thereby transmit the driving force of the internal combustion engine to the driving wheel; an operating condition detecting unit (for example, a brake pedal switch 45, a brake pressure detector 46 in the embodiment that will be described later) for detecting an operating condition of a braking unit (for example, a brake pedal in the embodiment that will be described later) operated by a driver; a stop condition detecting unit (for example, a vehicle speed sensor 43, an engine speed sensor 44 in the embodiment that will be described later) for detecting a stop condition of the internal combustion engine, and; a shift control unit (for example, an ECU 20 in the embodiment that will be described later) for controlling the operation of the connecting and disconnecting unit according to the operating condition detected by the operating condition detecting unit when the stop condition is detected by the stop condition detecting unit.

According to the vehicle control apparatus constructed as described above, the operating condition detecting unit has detected the operating condition of the braking unit operated by the driver when the internal combustion engine is stopped, and the connecting and disconnecting unit changes gear ratios of the transmission in stepped fashion according to the detected operating condition, whereby an appropriate driving torque can be generated according to the braking operation by the driver when the internal combustion engine is started to thereby prevent the generation of excessive so-called creeping torque that would be accompanied by the start of the internal combustion engine. Moreover, the high-speed gear is prevented from being selected excessively when the vehicle is started to thereby restrain the time lag required for selecting and changing gears, thereby making it possible to generate quickly a desired driving torque.

Furthermore, according to a second aspect of the invention, there is provided a vehicle control apparatus as set forth in the first aspect of the invention, wherein the shift control unit connects the input shaft with the output shaft by selecting a relatively low-speed side change-speed gear from the plurality of change-speed gears in the event that the operating amount (for example, the depressing amount, brake pressure and depressing load of the brake pedal in the embodiment that will be described later) of the braking unit detected by the operating condition detecting unit is relatively large or by selecting a relatively high-speed side change-speed gear from the plurality of change-speed gears in the event that the operating amount of the braking unit detected by the operating condition detecting unit is relatively small.

According to the vehicle control apparatus constructed as described above, in the event that the operating amount of the braking unit is relatively large, the relatively low-speed side change-speed gear is selected, whereby the response can be improved when the vehicle is started. In addition, in the event that the operating amount of the braking unit is relatively small, the relatively high-speed side change-speed gear is selected, whereby the generation of excessive so-called creeping torque can be prevented which would be accompanied by the start of the internal combustion engine.

Thus, an appropriate gear can be selected according to the braking operation by the driver, and the high-speed gear is prevented from being selected excessively when the vehicle is started to thereby restrain a time lag required for selecting and changing the gears, whereby a desired driving torque can quickly be generated.

Furthermore, according to a third aspect of the invention, there is provided a vehicle control apparatus as set forth in the second aspect of the invention, wherein at least the low-speed side change-speed gear is connected to the output shaft by way of a one-way clutch (for example, a one-way clutch 27 in the embodiment that will be described later).

According to the vehicle control apparatus constructed as described above, since the low-speed side change-speed gear is connected to the output shaft by way of the one-way clutch, the gear wheels on the low-speed side are kept meshing with each other at all times, and in the event that for example the high-speed side gear is selected, only the transmission of the driving force by way of the low-speed side change-speed gear is simply cut off by the one-way clutch. Due to this, even in the event that for example, the relatively high-speed side change-speed gear is selected while the internal combustion engine is being stopped, a desired driving torque can be generated by the low-speed side change-speed gear immediately after the selection of the high-speed side change-speed gear is released in conjunction with the release of the braking operation by the driver, whereby the generation of a time lag accompanied by changing the gears can be restrained better, for example, by selectively changing the change-speed gears for meshing when compared with a case where the transmission path of a driving force is switched from the high-speed side change-speed gear to the low-speed side change-speed gear.

Furthermore, according to a fourth aspect of the invention, there is provided a vehicle control apparatus as set forth in any of the first to third aspects of the invention, further including an electric oil pump (for example, an electric oil pump 17 in the embodiment that will be described later) for generating an oil pressure for driving the connecting and disconnecting unit, wherein the shift control unit activates the connecting and disconnecting unit using an oil pressure supplied from the electric oil pump when the stop condition detecting unit detects a stop condition of the internal combustion engine.

According to the vehicle control apparatus constructed as described above, the shift control apparatus can ensure the operation of the connecting and disconnecting unit by activating the electric oil pump even in the event that the discharge pressure of a mechanical oil pump driven by the internal combustion engine is lowered, for example, when the internal combustion engine comes to a stop.

Furthermore, according to a fifth aspect of the invention, there is provided a vehicle control apparatus as set forth in any of the second to fourth aspects of the invention, wherein the low-speed side change-speed gear is a low gear (for example, a forward first gear wheel pair 31 in the embodiment that will be described later) or a second gear (for example, a forward second gear wheel pair 32 in the embodiment that will be described later).

According to the vehicle control apparatus constructed as described above, in the event that the operating amount of the braking unit is relatively large, the low gear or the second gear is selected so that the high-speed gear is prevented from being selected excessively to thereby restrain the time lag required for selecting and changing the gears, whereby a desired driving torque can be generated quickly, thereby making it possible to improve the response when the vehicle is started from rest.

What is claimed is:

1. A vehicle control apparatus, comprising:

a transmission comprising a connecting and disconnecting unit for changing meshing conditions between a plurality of change-speed gears provided on an input shaft connected to an internal combustion engine and an output shaft connected to driving wheels, for connecting said input shaft with said output shaft in such a manner as to change gear ratios in a stepped fashion to thereby transmit a driving force of said internal combustion engine to said driving wheel;

an operating condition detecting unit for detecting an operating condition of a braking unit;

a stop condition detecting unit for detecting a stop condition of said internal combustion engine; and a shift control unit for controlling the operation of said connecting and disconnecting unit according to said operating condition detected by said operating condition detecting unit when said stop condition is detected by said stop condition detecting unit, wherein said internal combustion engine is stopped while a vehicle stops, and wherein said operating condition relates to an amount of braking pressure.

2. The vehicle control apparatus as set forth in claim 1, wherein said shift control unit connects said input shaft with said output shaft by selecting a relatively low-speed side change-speed gear from said plurality of change-speed gears in the event that an operating amount of said braking unit detected by said operating condition detecting unit is relatively large or by selecting a relatively high-speed side change-speed gear from said plurality of change-speed gears in the event that the operated amount of said braking unit detected by said operating condition detecting unit is relatively small.

3. The vehicle control apparatus as set forth in claim 2, wherein at least said low-speed side change-speed gear is connected to said output shaft by way of a one-way clutch.

4. The vehicle control apparatus as set forth in claim 2, wherein said low-speed side change-speed gear is a low gear or a second gear.

5. The vehicle control apparatus as set forth in claim 1, further compnsing:

an electric oil pump for generating an oil pressure for driving said connecting and disconnecting unit, wherein said shift control unit activates said connecting and disconnecting unit using an oil pressure supplied from said electric oil pump when said stop condition detecting unit detects the stop condition of said internal combustion engine.

* * * * *